United States Patent
Pfeiffer et al.

(10) Patent No.: US 7,209,898 B2
(45) Date of Patent: Apr. 24, 2007

(54) XML INSTRUMENTATION INTERFACE FOR TREE-BASED MONITORING ARCHITECTURE

(75) Inventors: Stephen Pfeiffer, Schriesheim (DE); Julian Droescher, Walldorf (DE); Christiane Kettschau, Leimen (DE)

(73) Assignee: SAP Aktiengesellschaft (DE)

( * ) Notice: Subject to any disclaimer, the term of this patent is extended or adjusted under 35 U.S.C. 154(b) by 694 days.

(21) Appl. No.: 10/260,729

(22) Filed: Sep. 30, 2002

(65) Prior Publication Data
US 2004/0078722 A1    Apr. 22, 2004

(51) Int. Cl.
G06Q 40/00     (2006.01)
H04K 1/00      (2006.01)
G06F 15/173    (2006.01)
G06F 11/00     (2006.01)
G06F 3/00      (2006.01)

(52) U.S. Cl. ............... 705/51; 705/1; 709/224; 714/47; 715/736; 715/513

(58) Field of Classification Search ............ 705/51, 705/1; 709/224; 714/47; 715/513, 736
See application file for complete search history.

(56) References Cited

U.S. PATENT DOCUMENTS

| | | | |
|---|---|---|---|
| 5,905,868 A * | 5/1999 | Baghai et al. | 709/224 |
| 6,513,060 B1 * | 1/2003 | Nixon et al. | 709/203 |
| 2002/0169860 A1 * | 11/2002 | Duggan et al. | 709/223 |
| 2003/0041142 A1 * | 2/2003 | Zhang et al. | 709/224 |
| 2005/0005011 A1 * | 1/2005 | DeLuca et al. | 709/224 |

FOREIGN PATENT DOCUMENTS

WO    WO 02/10919    *   2/2002
WO    WO 02/48866        6/2002

OTHER PUBLICATIONS

Cox, XML for Instrument Control and Monitoring, Dr. Dobb's Journal, M&T Publ., vol. 26, No. 11, Nov. 2001.*
Abiteboul et al., The Xyleme project, Computer Networks, vol. 39, No. 3, (Jun. 2002).
Fung, Decoding XML and the DTD, IBM.COM DEVELOPERWORKS XML, (Jul. 2001).
Cox, XML for Instrument Control and Monitoring, Dr. Dobb's Journal, M&T Publ., vol. 26, No. 11, (Nov. 2001).

* cited by examiner

Primary Examiner—Andrew Fischer
Assistant Examiner—Charlie C. L. Agwumezie
(74) Attorney, Agent, or Firm—Fish & Richardson P.C.

(57) ABSTRACT

An interface for providing monitoring information from any monitored component to a central monitoring system in which an XML document is created according to a DTD conforming to a tree-structured monitoring architecture and then is made available to the central monitoring system either by posting it as an HTTP message or filing it in a designated directory, where it can be periodically polled by the central monitoring system. An initial long-form XML document can be used to completely specify the monitoring tree for the monitored component, and then subsequent short-form XML documents can be posted with current data corresponding to the monitoring tree elements themselves. An XML processor at the central monitoring system converts the XML document contents and applies them to a standard interface which has previously been available directly to fully conforming components.

10 Claims, 10 Drawing Sheets

FIG. 7

Monitoring Attributes - Detail Data

General details

| Context | Object name | Short name | Type | Class | Highest alert | Number of alerts |
|---|---|---|---|---|---|---|
| CCMS_Selfmonitoring | Processing | XML Log | Log attribute | XML_Log | Red | 10 |

Log attribute (overview)

| ID | Indiv. display | Context | Object name | Short name |
|---|---|---|---|---|
| XML_Log_1 | No | CCMS_Selfmonitoring | Processing | XML Log |

Merged display of following log attributes ( Last 2000 Minutes ):

BCE\CCMS_Selfmonitoring\ . \Processing\XML Log

| ID | Date | Time | Valuation | Message Text |
|---|---|---|---|---|
| XML_Log_1 | 04.06.2002 | 08:55:29 | Green | 085529. HTTP request started |
| XML_Log_1 | 04.06.2002 | 08:55:34 | Red | 085529: XML-Parse-Fehler. Parse with DTD error (1 |
| XML_Log_1 | 04.06.2002 | 08:55:56 | Green | 085556. HTTP request started |
| XML_Log_1 | 04.06.2002 | 08:55:57 | Red | 085556. XML-Parse-Fehler. Parse with DTD error (1 |
| XML_Log_1 | 04.06.2002 | 08:56:34 | Green | 085634: HTTP request started |
| XML_Log_1 | 04.06.2002 | 08:56:34 | Red | 085634. XML-Parse-Fehler  Parse with DTD error (1 |
| XML_Log_1 | 04.06.2002 | 08:58:02 | Green | 085802. HTTP request started |
| XML_Log_1 | 04.06.2002 | 08:58:02 | Green | 085802: HTTP request successfully completed |
| XML_Log_1 | 04.06.2002 | 10:50:38 | Green | 105038: HTTP request started |
| XML_Log_1 | 04.06.2002 | 10:51:38 | Green | 105138: HTTP request started |
| XML_Log_1 | 04.06.2002 | 10:51:38 | Green | 105138: HTTP request successfully completed |
| XML_Log_1 | 04.06.2002 | 11:00:56 | Green | 110056: HTTP request started |
| XML_Log_1 | 04.06.2002 | 11:01:16 | Green | 110116: HTTP request started |
| XML_Log_1 | 04.06.2002 | 11:01:28 | Green | 110128: HTTP request started |

XML INSTRUMENTATION INTERFACE FOR TREE-BASED MONITORING ARCHITECTURE

TECHNICAL FIELD

This invention relates to monitoring the performance and status of various components of distributed client-server systems, and more particularly to transporting monitoring information and monitored data within an enterprise into a central monitoring system from sources that are not necessarily running on uniform computing platforms

BACKGROUND

In an enterprise computing environment, large, complex applications that are used in business-critical situations demand well-integrated monitoring and management for safe and successful operation. Monitoring helps avoid unplanned downtimes, which, for example, can produce costs in the six figures per hour. Tightly integrated monitoring systems for single computer family environments have been available for a number of years, for example in the SAP R/3 System. These monitoring systems are based on a suite of management and monitoring tools designed to monitor system resource usage and detect problems by generating statistics and reporting performance data from a variety of business applications running on common platforms.

Many enterprises increasingly find themselves using multiple distinct computing systems to run different aspects of their businesses. SAP for example created ALE (Application Link Enabling) and other technologies to allow multiple R/3 Systems to interact. Application-level links were created, for example, to allow R/3 Systems running the Sales or HR applications to update financials data across system boundaries.

In response to the vastly increased complexity of managing a landscape of systems that are in interaction with one another, centralized management systems were developed, such as SAP's Computing Center Management System (CCMS), that incorporate a uniform monitoring architecture that allows performance and error data to be collected from diverse applications in individual R/3 Systems and shared by means of R/3 Remote Function Calls (RFCs) between systems. Effectively, a customer could set up a central monitoring system, which saw the monitoring data from multiple R/3 Systems. However, because of its reliance on SAP's proprietary ABAP language and RFC, the view offered by the monitoring architecture was limited to traditional R/3 Systems and their application servers, together with the applications running in those systems.

With ever-greater diversity in the software landscape within single enterprises, as open component-oriented computing and Internet applications have been embraced, the pure one company proprietary approach to that environment has been relegated to the past. Given that some of these diverse components may participate in mission critical functions, it is just as important, however, from the IT department point of view, to monitor their performance as that of systems still running exclusively on the traditional core platforms like R/3.

Efforts to capture and transfer equivalent monitoring data from these diverse new sources so as to maintain the comprehensiveness of the existing centralized monitoring system have so far met with limited success. As at result, the scope of monitoring capable from within the centralized monitoring architecture has become over the years increasingly less adequate.

SUMMARY

According to one aspect of the invention in general a data collection interface method for supplying monitoring data from monitored components of a distributed computing system to a central monitoring system involves composing a structured text document, preferably XML compliant, containing monitored data derived from the monitored component according to a uniform data type definition associated with a tree-structured monitoring architecture, and then making the contents of the document available electronically to a central monitoring system for using the monitored data to assess and report the condition of the monitored component. The documents are preferably made available to the monitoring system in one of two ways: posting an HTTP message containing the XML document to the monitoring system from the monitored component or filing and updating the document from time to time in a directory accessible to the monitoring system. In the latter case, the monitoring system preferably periodically polls the document in the file.

The XML document can be one of two kinds, long-form or short-form. The long-form format is used initially to completely specify a monitoring tree for the monitored component. The short-form XML document is sent or stored, depending on the transport mode, from time to time with current data corresponding to particular monitoring tree elements.

In one aspect the interface enables a central monitoring system to cope with input from standard components that form part of a consistent system, such as SAP's R/3 software, and also cope with input data from other nonstandard distributed components by translating the parsed XML documents into the same language used by the standard components.

The preferred XML interface provides this solution by making new use of two broadly established technologies:
  The HTTP protocol used by Web browsers and other Web-enabled components.
  XML, essentially a formalized version of the Web markup language HTML.

XML allows generation of plain-text documents that are verifiably complete and syntactically correct and therefore 'valid' and which can be used to identify exactly the various elements of information that are contained in the document.

The use of HTTP (as well as file transfer by means of a CCMS polling agent) allow in the CCMS XML Instrumentation Interface make it possible for a broad range of SAP non-R/3 components (and R/3 itself) and non-SAP components to communicate with the monitoring architecture without having to implement SAP RFC or incorporating any CCMS Monitoring Architecture Interfaces in programming.

Like HTTP, the capability of generating XML documents is anchored in the infrastructure of a broad range of SAP and non-SAP Web components (there are Java class libraries for XML and most J2EE servers offer native XML services), so the effort to produce an XML document that uses the CCMS XML protocol is not very high.

The XML Instrumentation Interface is made even more attractive by the specific XML protocol it uses, which has been optimized to allow instrumented components to use the full range of monitoring design and customizing options offered by the Monitoring Architecture, while at the same time reducing the complexity and volume of the XML documents that have to be produced.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 7 is a screen shot showing a typical XML Log screen.

Like reference symbols in the various drawings indicate like elements.

DETAILED DESCRIPTION

Figure 1:
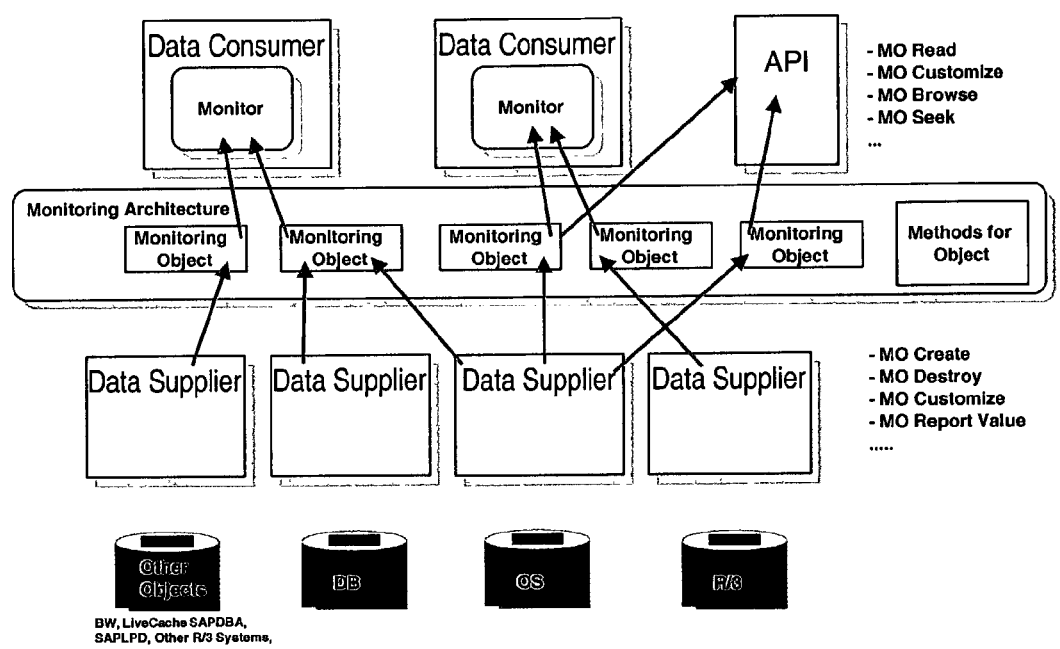
FIG. 1 is a block diagram of a pre-existing monitoring structure for a central computer management system.

The following description relates to a specific XML interface designed for SAP's CCMS Monitoring Architecture. First, as background, the pre-existing monitoring architecture within CCMS is shown in FIG. 1. Data suppliers are programs that provide data to the monitoring architecture. They belong to individual system components, e.g., an HR application, and create monitoring objects, providing the monitoring architecture with values displayed in the monitor sets. On the other hand, data consumers are programs that read data from the monitoring architecture (such as the monitor sets).

Based on the information reported by data suppliers, the monitoring architecture displays graphically the status of a system or systems and draws the system administrator's attention to any problems that have occurred by means of alerts in the alert monitor. These alerts are "trouble tickets," which the IT administrator must resolve.

The monitoring architecture shown in FIG. 1 is implemented as a C library and can, therefore, be implemented in other software components running on the same or other SAP platforms within the enterprise. Thus, the structure of the objects is created in such a way that a single centralized management system can monitor several SAP Systems.

Data suppliers report their data on one or more monitoring objects (as shown by the arrows in FIG. 1). A monitoring object is created by a collection method or data supplier and represents a component of the SAP System or its environment that should be monitored. A monitoring attribute represents one type of information about a monitoring object that is to be reported. Monitoring objects and their attributes are each displayed in the alert monitor as individual nodes or monitoring tree elements (MTEs) in a hierarchical tree. If the data that is reported to the monitoring architecture violates the defined alert thresholds, an alert is triggered in the appropriate MTE for that data, which in turn causes an alert condition on the screen for the line corresponding to that MTE and all MTEs on the branch of the tree to which the problem MTE belongs.

There are five types of monitoring attributes:

1. Performance attribute Collects and averages reported performance values.

2. Status attribute Reports error message text and alert status.

3. Heartbeat attribute Checks that components of the SAP System are running. It generates an alert when no values have been reported on a monitoring attribute for a long time.

4. Log attribute Represents multiple messages. Effectively, a log attribute provides a means of displaying and evaluating log files and trace files within the monitoring architecture. Log attributes can capture an existing log mechanism, such as the SAP system log, or an application can use it to implement its own log.

5. Text attribute Enables a data supplier to report information that has no alert valuation. The text can be updated as required.

The monitoring architecture represents the individual monitoring objects of the SAP System in a hierarchical tree. Each object in the monitoring tree can be assigned a separate severity and criticality, which affect the alert that is displayed when a critical situation occurs. The tree reflects the current implementation of the SAP Systems that are being monitored, that is, the monitor adapts itself automatically to the current configuration of the systems that it is monitoring.

System administrators need to work with two different views in the monitoring architecture. These are:

1. Open alerts view (see FIG. 3) Displays any problems that have occurred and which have not yet been analyzed.

2. Current system status view (see FIG. 2) Displays the most recently reported data for each monitor node.

For each alert that occurs, the system administrator can call up special analysis methods for the corresponding monitoring attributes in both of these views.

Each view also has three levels of detail:

1. Overview Displays only those MTEs that are essential for monitoring the status of the system. Used for routine monitoring of the system during normal operation.

2. Analysis Adds MTEs that are intended for problem analysis or performance tuning to the display. Switch to this view if you need to examine a problem or want to analyze the system in detail.

3. Expert Adds internal SAP MTEs These MTEs are probably useful only if you are working with an SAP consultant, the SAP hotline, or the EarlyWatch service. Specialized knowledge may be required to interpret data at this level.

Alerts report and log warnings and problems in an SAP System and its environment. Alerts also direct system administrators' attention to critical situations and relieve them of constantly having to review the whole set of information. Alerts must always be processed by a system administrator, otherwise they remain in the alert browser.

The alert status of each node of a monitoring tree is clearly displayed and color coded according to criticality. A red alert indicates a problem or an error, a yellow alert indicates a warning. Green status, or the absence of alerts, indicates that there are currently no problems with the component being monitored.

The importance of a red or yellow alert is ranked according to its severity. Since the monitoring architecture propagates alerts up the monitoring tree, it is necessary to have an attribute for prioritizing alerts that have the same criticality (yellow or red). The severity serves as this attribute. A red alert with a higher severity than another red alert has higher priority. The red alert with the higher severity is therefore propagated up the monitoring tree as the most important alert.

Current System Status View

Figure 2:
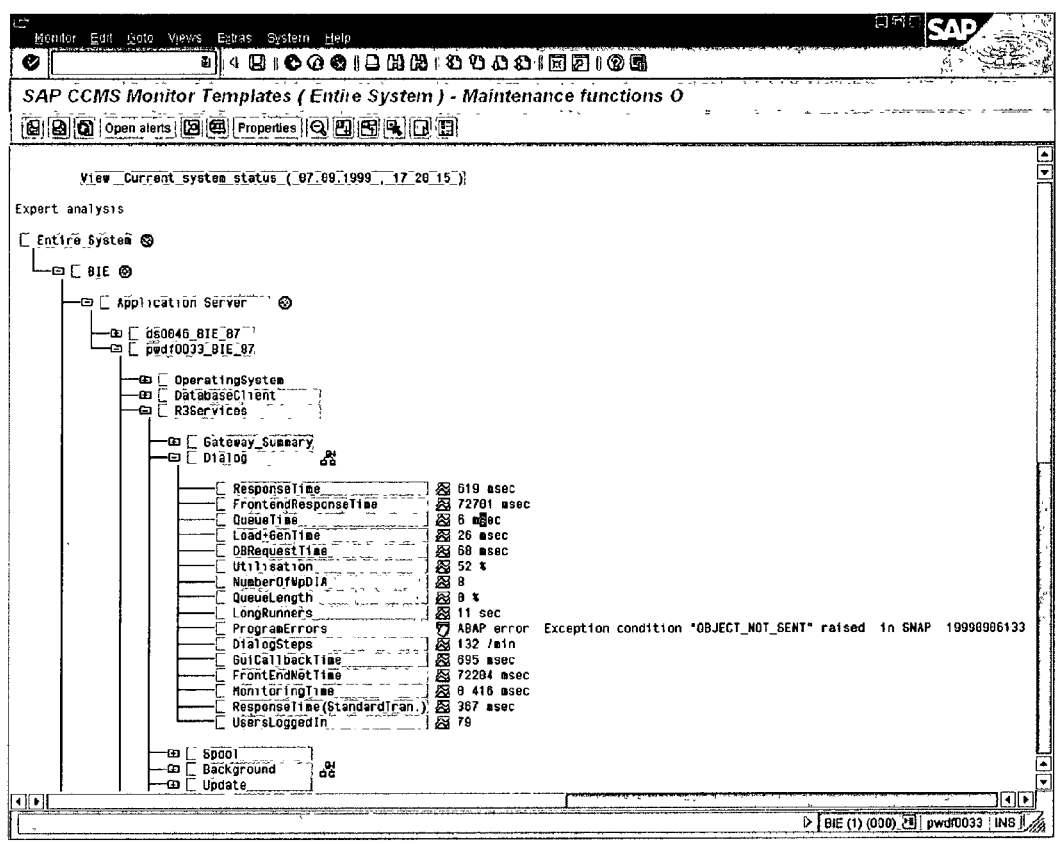
FIG. 2 is a screen shot showing a typical current status screen on a monitor.

As shown in FIG. 2, the current system status view provides an overview of the current values that were reported to the monitoring architecture. It displays the relevant values for all attributes, for example, the performance value or the last report that was received.

The highlighting color of the line of the display associated with the monitoring object (red, yellow or green) indicates its status, as described above, and is independent of any open alerts that may exist for that MTE. For example, an MTE may be green because everything is currently alright, even though that MTE may have open alerts. Note that the display can be set to refresh automatically so the most current system status is always displayed.

Open Alerts View

Figure 3:
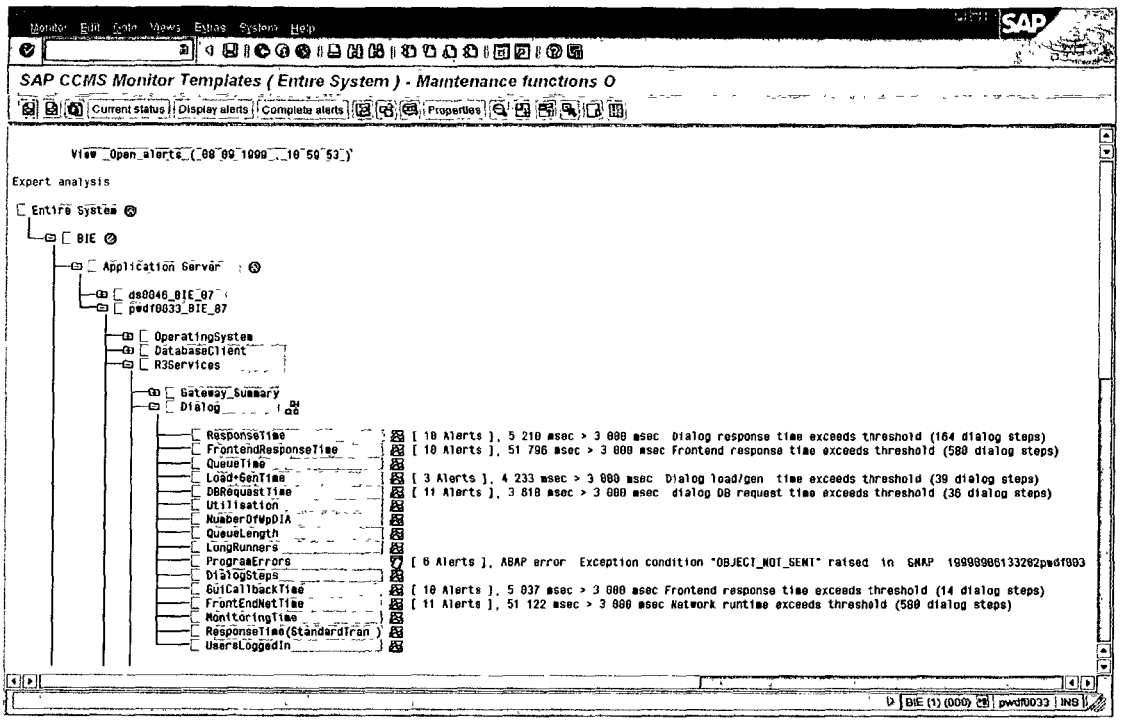
FIG. 3 is a screen shot showing a typical open alerts screen on a monitor.

As shown in FIG. 3, the open alerts view displays the alerts that have occurred for an attribute in a specific monitor. As described above, for each monitoring object, the system displays the most important, that is the most critical and the most severe, current alert, regardless of the total number of alerts for that object.

For every node that you select in the tree, the system can:

Display details on the alert

Customize all node elements

Start analysis methods

Monitoring properties are associated with each MTE and are inheritable by propagation through the tree.

Changing Monitors

The monitoring architecture can be easily changed to specify when alerts are triggered, or define and modify methods, their assignment, and their configuration.

Changes can be made to the properties, or settings, of a monitor from every monitoring tree element. Properties are either specific to a monitoring attribute, or they apply to a monitoring attribute group. This avoids having to maintain the same properties for many individual monitoring attributes and then saving them in the database. By editing and saving the relevant attribute group, the properties that apply to this group are assigned to the corresponding monitoring attributes.

Monitoring Properties Variants

The properties in an alert monitor represent a particular policy for managing a system or set of systems. With monitoring properties variants, the monitoring architecture allows for several of these policies to be maintained and distributed from a central maintenance system for decentralized monitoring.

A monitoring properties variant saves any or all of the available customizing settings. For example, to maintain different alert thresholds for response time in test systems and production systems, you could define separate monitoring properties variants for these settings. An alert monitor in a production system could run with the properties variant for production response times, whereas an alert monitor in a test system could run with the test system variant.

Monitoring properties variants can also be assigned to operation modes, with the advantage that properties variant no longer have to be activated manually, but will start when the corresponding operation mode starts.

Default Monitoring Properties Variant

The SAP-DEFAULT monitoring properties variant contains the default values for properties of MTEs in the monitoring architecture. This variant can be used as a template for creating your own properties variants for specific MTEs. The values in the SAP-DEFAULT variant cannot be changed or deleted, although you can copy them and then make changes to the copy. The advantage of the SAP-DEFAULT properties variant is that if you do not specify your own values for a specific MTE, then the SAP-DEFAULT values will apply. In this way, SAP-DEFAULT can be used as a fallback if you accidentally change the values provided by SAP in the SAP System, as well as a reference to the values that SAP recommends you should use.

There is also a properties variant hierarchy in the monitoring architecture. At the bottom of this hierarchy are values in SAP-DEFAULT. At the top of the hierarchy are MTE values that have been changed by customers and stored in an active properties variant. When you create a new monitoring properties variant, you can specify a "parent" properties variant, whose values are used if no value is specified for that MTE class in a customer-defined properties variant. If, in turn, this parent properties variant contains no values for that MTE class, the system uses SAP-DEFAULT values. System administrators can also assign monitoring attributes to methods.

Methods

A method can be a report, function module, SAP transaction, or URL that should be executed in response to an alert. For example, if you double-click on the MTE for abnormally terminated jobs, the monitoring architecture automatically starts the job-management transaction, preselecting the job reported in the MTE.

The monitor architecture provides the following method types:

Analysis method For exact analysis of error situations without leaving the monitoring architecture Auto-reaction method For automatic response when an alert is triggered Data Collection method For gathering information on the SAP System and its environment and registering it with the monitoring architecture.

Methods assigned to MTE classes can also be assigned to monitoring properties variants. This has the advantage that different methods can be executed in different monitoring properties variants, providing greater flexibility for monitoring SAP Systems.

Existing Interface between Data Suppliers and the monitoring architecture.

Figure 4:
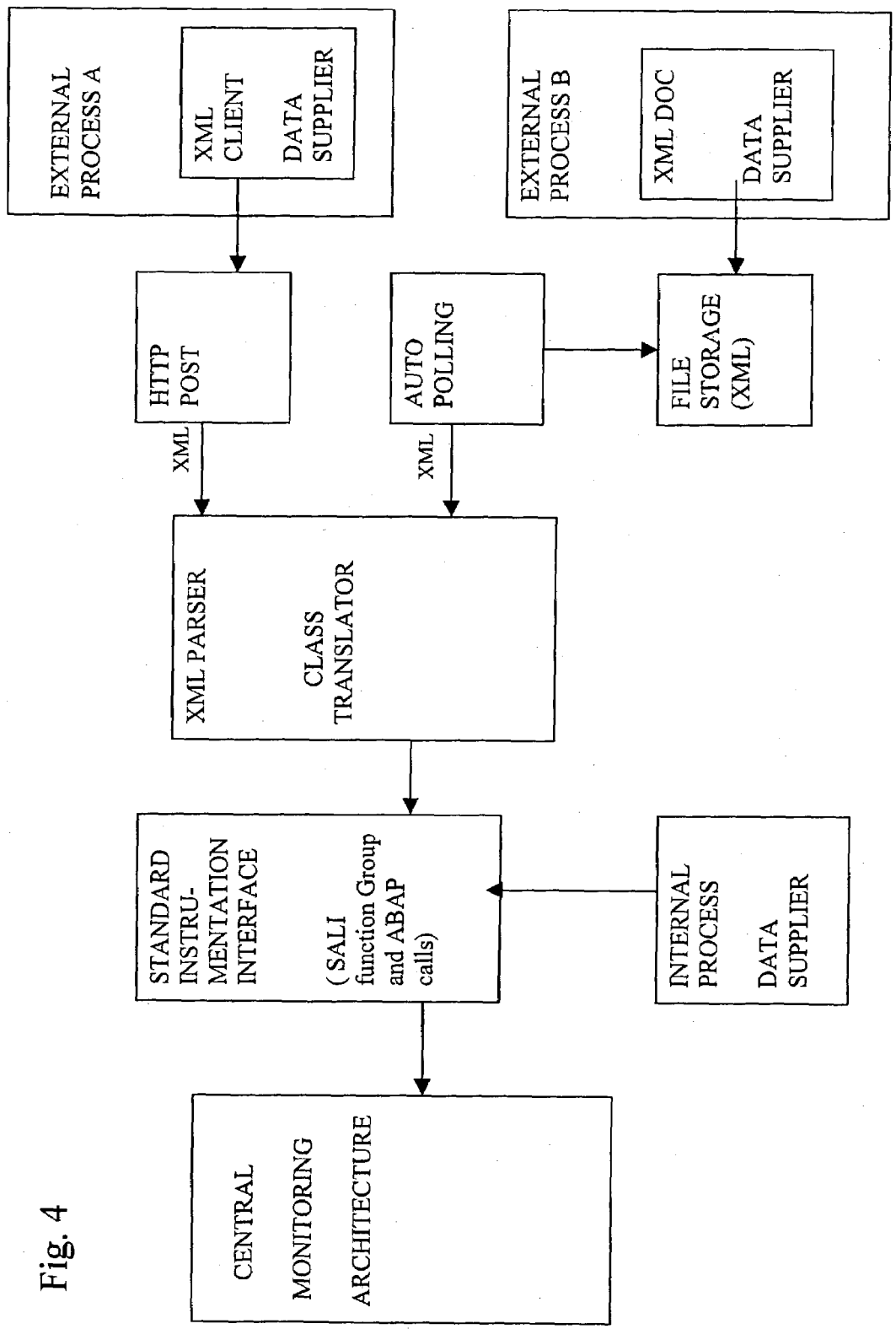
FIG. 4 is a block diagram of the monitoring system including both the prior method and the new XML interface.

The existing interface for data suppliers in FIG. 1 relies on software in the CCMS system for capturing data and formatting it for use by the monitoring architecture. This functionality existed in the so-called ABAP interface to the monitoring architecture in function group SALI, as indicated in FIG. 4. Monitored components residing on SAP platforms within the enterprise use the ABAP interface directly to convey monitored data to the monitoring architecture.

XML Interface to the Monitoring Architecture

The new system permits completely independent components to interface in a functionally equivalent way with the monitoring architecture though the use of XML documents as an intermediate step.

Extensible Mark-up Language (XML) is a set of rules for structuring data in a document that can be exchanged over the World Wide Web (the "Web"). XML is a subset of an early mark-up language SGML used for technical documentation. XML's particular aim is to simplify SGML and make it compatible with the Web like HTML. But unlike HTML the tags and attributes within XML can all be user-defined as desired, not just for browsers but for any target program. XML is an open standard developed and maintained by the World Wide Web Consortium (W3C). A copy of the current specification for XML 1.0 can be found at http://www.w3.org/TR/REC-xml, which is a stable HTML document offered by WC3 specifically to be used as reference material or cited as a normative reference from another document. The XML standard is a set of strict rules that specify well-formed XML documents, involving tags, namespaces and attributes, etc. These variable parameters give meaning in the context of the target program to data contained within what is actually a text document, one that, as we shall see below, can be visualized with any word processing system. An XML document's purpose, however, is to be parsed and processed by an XML processor that tests the document for validity and sorts out and conditions the data in the XML document and, for example, feeds it to an associated application.

In order to interface non SAP or "foreign" components with the above-referenced centralized monitoring architecture, XML is exploited as an interface or data transport mechanism for the external data supplier, particularly those that would otherwise be unable to access the traditional standard interface for fully compliant SAP components.

In order to be a valid XML document, according to XML 1.0, the document must contain a document type declaration to define constraints on the logical structure and to support the use of predefined storage units. An XML document is valid if it has an associated document type declaration and if the document complies with the constraints expressed in it. The XML document type declaration contains or points to markup declarations that provide a grammar for a class of documents. This grammar is known as a document type definition, or DTD. The document type declaration can point to an external subset (a special kind of external entity) containing markup declarations, or can contain the markup declarations directly in an internal subset, or can do both. The DTD for a document consists of both subsets taken together. A markup declaration is an element type declaration, an attribute-list declaration, an entity declaration, or a notation declaration.

The system described below specifies the DTD and is fully compliant with the required syntax of XML 1.0 referred to above. Examples are given.

XML interface to the CCMS Monitoring Architecture

All of the instrumentation options provided by the existing ABAP interface to the monitoring architecture in function group SALI are made available through the XML interface:

The interface therefore allows complete flexibility in constructing monitoring trees—hierarchical structures representing monitoring data. The XML interface imposes no restrictions of its own on the type or complexity of information structure you can create with XML documents in the monitoring architecture Processing of XML Documents: Overview Monitoring data in XML format can be delivered to the CCMS in two ways:

The data can be delivered as HTTP POST requests addressed to the service /default_host/sap/bc/ccms/monitoring/ at, for example, the central monitoring system in a customer environment. The HTTP POST method allows the reporting component to push data into the monitoring architecture as required.

Alternatively, as shown in FIG. 4, the data can be delivered as a file in a directory that is readable by a CCMS agent. Typically, such an agent would report to a central monitoring system. Both the SAPCCMSR and SAPCCM4X agents can be used for gathering XML data from files.

The alternative file method is a polling method. It requires a data collection method in the monitoring architecture that specifies where XML data files are to be found. The monitoring architecture then periodically checks for files that meet the naming specification in the method definition, the file selection method specified (newest file or all files), and which have not yet been processed (files must be newer than the timestamp of the last run of the XML file processing method).

To allow for synchronization between file-writing and file-reading, the data collection method also looks for a file called CCMS__XML__MONIDATA__FILE__LOCK in the target directory. If found, then no files are read into the monitoring architecture. This means that a component that is writing a file can in effect lock the directory and prevent the CCMS from reading an incomplete XML file. When the lock file is removed, then all files saved since the last successful data supplier run are processed.

No matter which way the XML document arrives in the system, it is processed in the class CL__CCMS__MONIDATA__XML__RECV. This class translates the data in the XML document into calls to the SALI function group, the ABAP instrumentation interface of the monitoring architecture.

Because the SAP System does not support external DTDs, the CCMS monitoring DTD is automatically associated with the document and is used to verify the validity of the message. You can obtain the DTD either from the SAP Service Marketplace under alias monitoring or by sending a GET request with the query string Name="CCMS__INSTRUMENTATION__DTD" to the CCMS service mentioned above. The version form the SAP Service Marketplace includes comments that are not available in the GET version.

Errors are reported both in the monitoring architecture (Monitoring context CCMS__SelfMonitoring, subtree XML__SelfMonitoring) and are also, if the XML document was sent in as an HTTP POST, returned to the XML client as the HTTP response to the POST.

XML Long-Form and Short-Form

XML monitoring interface documents come in two categories, long-form and short-form, defined by respective DTDs. The short form takes full advantage of an existing monitoring tree with all of the MTEs already leafed out and attributed. This form is used primarily for transport of monitored data, e.g., performance and error data. The long-form permits the monitored component itself to set up its own tree. This is typically done in the beginning and once done, short-form XMLs can be employed to supply the data to the MTEs of the tree.

In the long-form XML document, you can create and report information into a monitoring tree with any structure that you wish any type of monitoring tree element (MTE) supported by the monitoring architecture.

With the long form of the CCMS XML protocol—no assumptions are made about the MTEs that are available in the monitoring architecture. Rather, the XML document must create the complete monitoring tree as required by the reporter. The data that is provided at the same time in the XML document is then reported into the attribute MTEs in the tree. That is, you must start in your XML document by doing a CREATE-ATTACH to the context, then add any monitoring, summaries and objects you need, and finally CREATE-ATTACH to the monitoring attributes at the leaf-level of your monitoring tree(s).

The short form of the CCMS XML protocol reports information directly into a single, specific MTE that is identified by its full SAP name. This format reports an item of data into a specific MTE that already exists.

By default, XML MTEs are persistent across system starts in the SAP System that is doing the monitoring. Accordingly, as an XML data reporter, one would ideally create the complete monitoring tree that you need once using the long DTD format, and then subsequently report data into specific MTEs in this monitoring tree using the DTD short form.

The CCMS XML DTD

The DTD requires the following structural features:

The element that identifies the start and end of the document body is SAP_CCMS: DataSupplierReport. You must identify your company and component in this element so that the CCMS can perform an internal 'XMI' (External Monitoring Interface) logon and report the XML transaction.

The highest-level operative element is always MTE:Instance.

If the MTE:FullName element is provided within MTE: Instance, then this MTE: Instance is a short-form XML document that identifies an existing MTE by its full name. This MTE should always be a monitoring attribute, because the short-form document also allows for reporting data into the MTE.

```
<SAP_CCMS:DataSupplierReport>
   <MTE:Instance>
      <MTE:FullName>&SY\ContextName\ObjectName\AttributeName>
      </MTE:FullName>
   ...
   </MTE:Instance>
</SAP_CCMS:DataSupplierReport>
```

The term &SY in the FullName is the CCMS variable that represents the system SID. Since the & character is a special character, it should be encoded as %26 or #38 in the XML document. It is de-encoded automatically by the SAP Web AS.

If the MTE:Name element is provided within the MTE:Instance, then the initial MTE: Instance is the root of a monitoring tree, a monitoring context. The monitoring tree can contain as many MTEs as the reporter wishes, and any permissible monitoring-tree structure may be built up.

Only the MTE:Name element is allowed for naming MTEs within the tree defined by the uppermost MTE:Instance. You cannot include a MTE:FullName in such a tree. Here is an example:

```
<SAP_CCMS:DataSupplierReport>
   <MTE:Instance>
      <MTE:Name>ContextName
      </MTE:Name>
         <MTE:Instance>
            <MTE:Name>ObjectName
            </MTE:Name>
            <MTE:Instance>
               <MTE:Name>AttributeName
               </MTE:Name>
            </MTE:Instance>
         </MTE:Instance>
   </MTE:Instance>
</SAP_CCMS:DataSupplierReport>
```

The attributes and elements specific to each type of MTE, such as a context, a summary, or a performance attribute, are contained in a PARAMETERS element. For example, the PRF: PerformanceParameters element provides the attributes and additional elements for creating or attaching to a performance attribute and then reporting a performance metric into it.

You can allow most attributes (which generally represent meta-information on MTEs) of XML MTEs to default to standard values. Very few attributes are required.

The constants used as values in attributes are identical to those used in ABAP in the SALI instrumentation interface. You can find constants and their definitions in the ABAP includes RSALEXTI and RSALINTI. Numerical values are converted automatically from character representations of digits.

If you are reporting with XML files: Be sure that elements are not broken up by new lines. An element must be located on a single logical line in the file.

Preparing for the HTTP-Method

In order to pass XML documents to the monitoring architecture by way of HTTP POST requests, the configuration of the CCMS XML service must first be completed. A logon user must also be provided, such as the familiar CCMS service user csmreg, to allow logons without user interaction. The service definition itself is part of the SAP_BASIS component.

To complete the configuration of the service, the CCMS XML communication system must simply be activated. By way of example the following steps are required for the SAP r/e ccms monitoring system to accept XML documents from a data supplier:

1. In the SAP System in which XML documents are processed, start transaction SICF.
2. Drill down along the following path: default_host→sap→bc→ccms→monitoring.
3. Double-click on service CCMS_XML.
4. Fill out the Anonymous logon data dialog box and save CCMS_XML.
5. Activate CCMS_XML by choosing Service-Virtual host→Activate.

After activation, HTTP POST requests should be sendable to the CCMS_XML service without an interactive logon.

Defining CCMS Methods for XML File Polling

While the HTTP POST method allows active reporting of data into the monitoring architecture, the file-polling method uses the passive data collection capabilities of the monitoring architecture. In file polling, the monitoring architecture runs a data collection method at start-up and periodically as required.

For each file specification (directory and file name specification), you must define a CCMS data collection method that specifies the files to collect and the agent to ask for them.

The sample method CCMS_XML_FILE_POLL, delivered with the system, requires the following parameters:

| Parameter | Meaning |
| --- | --- |
| DIRECTORY | fully specified name of the directory in which XML files are to be found |
| FILENAME | naming convention for XML files to consider for reporting; this name may end with a wild-card character (*) |
| AGENT_DESTINATION | RFC destination of the agent which is to provide access to the XML files; the agent must have READ access to the pathname specified in DIRECTORY and to the files identified by FILENAME |
| FILE_SELECTOR | specifies which of the files in the directory are to be processed; possible values are: ALL: All XML documents that are newer than the last data supplier run time stamp and which meet the FILENAME naming convention are processed. NEWEST: Only the newest XML document that is newer than the Last data supplier run time stamp and which meets the FILENAME naming convention is processed. Other files are ignored. The file selector lets you distinguish between cases when perhaps multiple components are writing XML documents and several such files are of interest and cases in which one component repeatedly writes XML documents, of which only the newest is of interest. |

Figure 5:
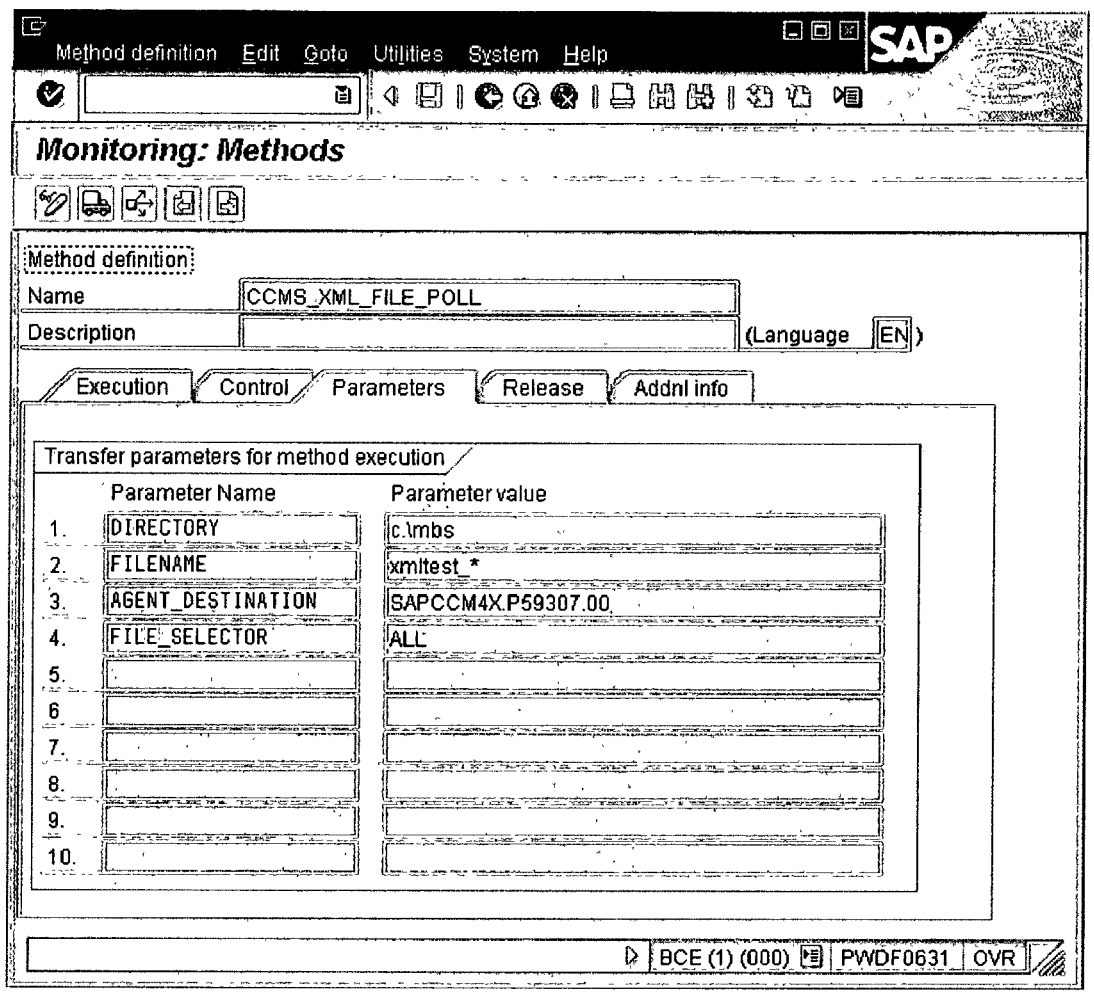
FIG. 5 is a screen shot showing an example of the screen for setting up file polling parameters.

An example of how a typical screen view would appear for entering the above data for file polling is shown in FIG. 5.

Error Analysis and Self-Monitoring

Figure 6:
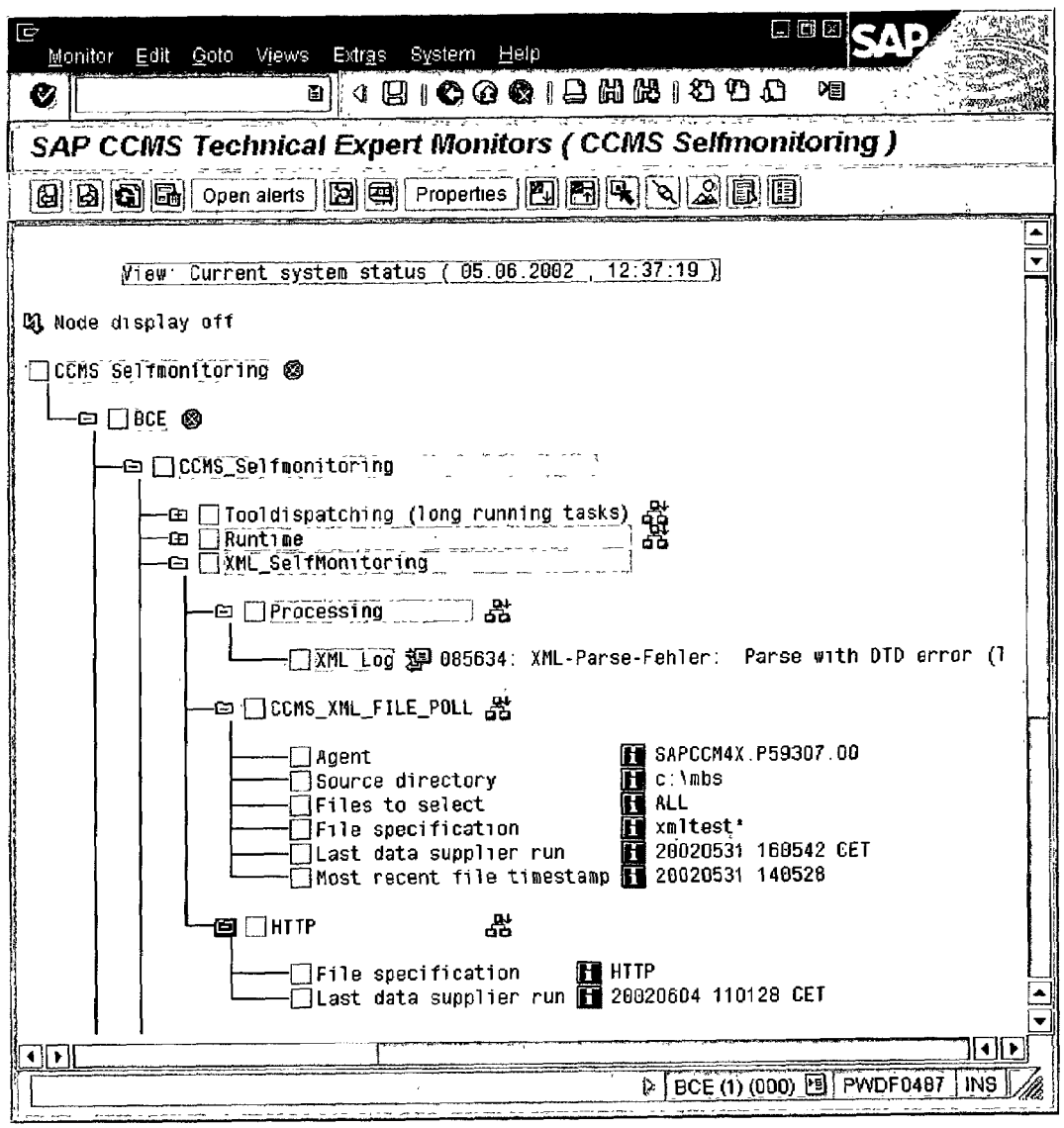
FIG. 6 is a screen shot showing an example of the display for self-monitoring of the XML processing class.

The XML processing class reports on its activity in the CCMS_SelfMonitoring monitoring tree. You will find the XML MTEs under the root MTE XML_SelfMonitoring: FIG. 6 shows an example of self monitoring screen.

The XML Log

The XML log reports the start and stop of processing, whether originated through HTTP or file polling. All entries pertaining to a processing run carry a uniform time stamp, so that you can associate the entries that belong to a processing run even in a busy system.

A successful run reports only the start and stop of processing, and if file-polling, also the name(s) of any files that were processed or a message that no files were newer than the file-polling timestamp (Last data supplier run MTE).

To check the entries of the log, select the attribute XML Log in the alert monitoring tree and choose Display details: FIG. 7 shows an example of the XML Log screen.

Any errors that occur are also reported in the log. The three categories of error are:

1. XML parse errors (errors during a preliminary parsing without using the CCMS DTD). In this type of error, there are formal errors, such as unbalanced tags, in the XML document.

2. XML parse errors with DTD (errors during a final parsing using the CCMS DTD, which is generated internally in the SAP System and then associated with every incoming CCMS XML document). In this case, there has been some violation of the CCMS DTD, such as missing or unexpected elements or elements out of order.

3. SALI errors (errors that occurred during SALI function module calls to create or manipulate MTEs). These errors return the error string produced by the SALI call.

If you report XML documents by means of HTTP POST requests, then all error messages that appear in the log also are returned to your HTTP client as the HTTP response. In addition, the HTTP response contains the XML document as a string in the state in which it was passed to the CCMS XML-processing class.

CCMS_XML_FILE_POLL and HTTP Statistics

These two subtrees report on the XML processing activity:

1. The arrival of an HTTP POST request prompts the creation or updating of the HTTP tree. This reports the time stamp in the monitoring system at which the most recent HTTP run occurred. You can use this timestamp to identify the XML log entries associated with the processing of the POST.

2. For each file-polling method, there is a separate monitoring subtree. Illustrated is the subtree for the sample method CCMS_XML_FILE_POLL that is delivered with the system. The MTEs in each subtree report the agent that was used, the file selection criteria, and the time stamps of the last run of the data supplier and of the newest file that was found. The Last data supplier run time stamp corresponds to the timestamp on XML log entries produced by the run. It is also used to screen out old files that are found in the same directory. Only files that are newer than this timestamp are considered for processing.

The XMI Logon and Auditing

The CCMS's BAPI interface for reading monitoring data requires the so-called XMI logon. This is an internal CCMS logon without any effect on the user's session. It is used to record actions in the monitoring architecture of callers from outside the SAP System.

The CCMS XML interface also uses the XMI mechanism to log the start and finish of the processing of an XML document and optionally also to log the SALI calls that result from the processing of an XML document. This last tracing or auditing option is of course of interest if you are trouble-shooting a document.

The XMI logon and audit parameters are carried as attributes of the SAP_CCMS:DataSupplierReport element and are as follows:

| Parameter | Reqiured/Optional | Meaning |
| --- | --- | --- |
| extcompany | required | The name of the entity that is reporting the monitoring data. |
| extproduct | required | The name of the product to which the monitoring data pertains. extcompany and extproduct are used together to identify the entity that is reporting and perform an XMI logon. |
| interface | optional | The CCMS interface that is being used in the XMI session. At this time, the only valid value in an XML DataSupplierReport document is XAL. XAL is also the default value. |

-continued

| Parameter | Required/ Optional | Meaning |
|---|---|---|
| version | optional | The version of the CCMS interface that is being used in the XMI session. At this time, the only valid value in an XML DataSupplier Report document is 1.0. This is also the default value. |
| auditlevel | optional | This value switches on or off detailed activity tracing in the XMI log, viewable with transaction RZ15.<br>Value 0: Detailed auditing switched off. Only the XMI logon and logoff are recorded in the XMI log.<br>Value 1: Detailed auditing switched on. Calls to the ABAP write interface (SALI interface) that result from the processing of an XML document are recorded in the XMI log. Exception: Calls that write to the self- |

-continued

| Parameter | Required/ Optional | Meaning |
|---|---|---|
| | | monitoring sections of the monitoring architecture are not logged.<br>Switching to this audit level can help you to trouble-shoot an XML document. With the audit, you can trace the construction of and reporting of data into a monitoring tree. |

Sample XML Messages

The next sections show sample XML documents that create, attach to or report into the most important types of MTEs: performance attributes, status message attributes, and log attributes.

Create a Performance Attribute—Long-Form XML Document

The following sample XML document creates a complete monitoring tree terminating in a performance attribute. The XML document uses many more attributes than are actually necessary, assigning for example an SAP T100 message for documentation and methods for each MTE. Most attributes can be allowed to default.

Figure 8:
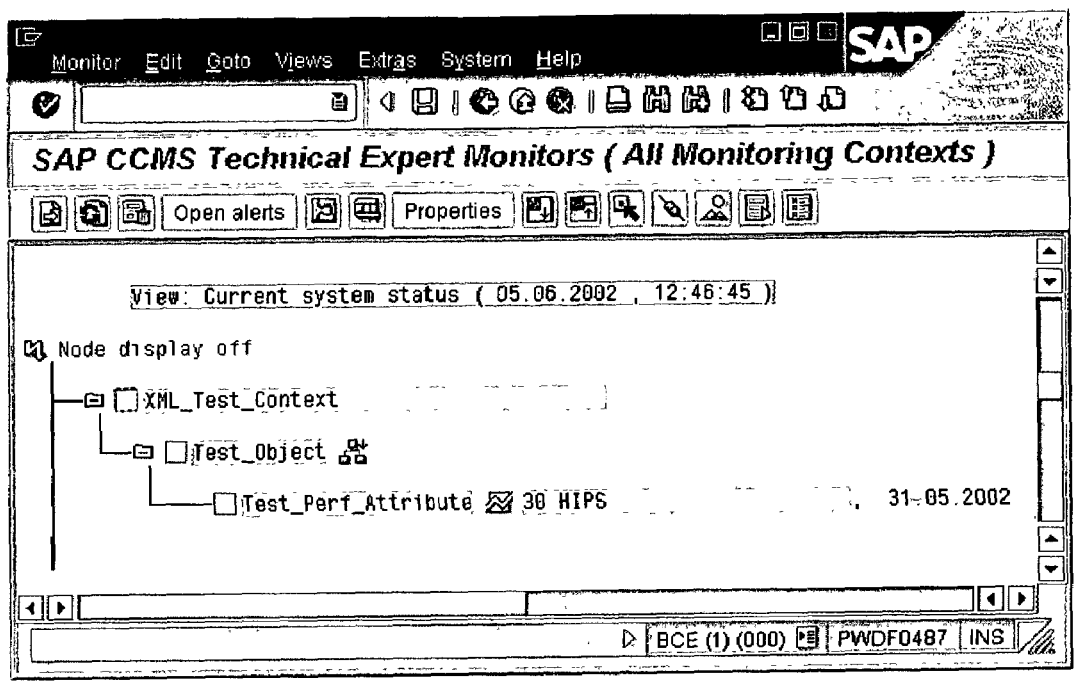
FIG. 8 is a screen shot showing an example of a complete monitoring tree created by a long-form XML document terminating in a performance attribute.

The result is shown in FIG. 8: Here is the XML document:

```
<SAP_CCMS:DataSupplierReport extcompany="Test" extproduct="New">
    <MTE:Instance type="CONTEXT" class="XML_TEST" owner="XML_TEST"
numrange="AL_NR_AUTO" descmsgid="RT" descmsgno="112" co_method="CCMS_XML_FILE_POLL"
an_method="cxml_an" au_method="cxml_au">
        <MTE:Name>XML_Test_Context</MTE:Name>
        <CNTXT:ContextParameters cntxt_clnt="000" cntxt_sysw="YES">
</CNTXT:ContextParameters>
        <MTE:Instance type="OBJECT" class="XML_TEST_OBJECT" owner="XML_TEST"
numrange="AL_NR_AUTO" descmsgid="RT" descmsgno="113" co_method="CCMS_XML_FILE_POLL"
an_method="oxml_an" au_method="oxml_au">
            <MTE:Name>Test_Object</MTE:Name>
            <MTE:Instance type="PERFORMANCE_ATTRIBUTE" class="XML_TEST_PAttrib"
numrange="AL_NR_AUTO" owner="XML_TEST" descmsgid="RT" descmsgno="114"
co_method="CCMS_XML_FILE_POLL" an_method="pxml_an" au_method="pxml_au">
                <MTE:Name>Test_Perf_Attribute</MTE:Name>
                <PRF:PerformanceParameters agroup="test_xml" subtype="AL_STD_NO_SUBCLASS"
severity="248" alkptype="AL_KEEP_OLDEST" alkpmax="12" g2y="5" y2r="10" r2y="8" y2g="4"
p_unit="HIPS" p_decimals="1" p_relval="AL_PERF_RV_SMOOTH_05" p_thrshdir="ABOVE"
almsgid="RT" almsgno="001" sec_repeat="240" sec_inact="600" sec_warmup="10">
                    <PRF:TotalVal>300</PRF:TotalVal>
                    <PRF:NumberVal>1</PRF:NumberVal>
                    <PRF:ReportedBy>XML_TEST</PRF:ReportedBy>
                </PRF:PerformanceParameters>
            </MTE:Instance>
        </MTE:Instance>
    </MTE:Instance>
</SAP_CCMS:DataSupplierReport>
```

Refresh a Performance Attribute—Short-Form XML Document

A short-form XML document allows you to report a new value for an existing attribute MTE (leaf-level MTE). The short form identifies the MTE by its fully-specified name in the monitoring architecture. It is not necessary to build the full monitoring tree to report into the attribute MTE and you need not repeat the default customizing that was specified when the MTE was first created.

An efficient pattern is to create a complete monitoring tree once or only at relatively long intervals, such as at system starts. This start-up processing requires a 'long-form' XML document. All later reporting of data into an MTE can use the short-form, saving network bandwidth and processing time in the client and in the server.

The effect of the XML document is to report new data into an MTE, refreshing the MTE and potentially triggering an alert. The document looks like this:

```
<SAP_CCMS:DataSupplierReport extcompany="Test" extproduct="New">
  <MTE:Instance type="PERFORMANCE_ATTRIBUTE" class="XML_TEST_PAttrib" owner="XML_TEST">
    <MTE:FullName>%26SY\XML_Test_Context\...\Test_Object\Test_Perf_Attribute</MTE:FullName>
    <PRF:PerformanceParameters>
      <PRF:TotalVal>300</PRF:TotalVal>
      <PRF:NumberVal>1</PRF:NumberVal>
      <PRF:ReportedBy>XML_TEST</PRF:ReportedBy>
    </PRF:PerformanceParameters>
  </MTE:Instance>
</SAP_CCMS:DataSupplierReport>
```

Create a Log Attribute—Long-Form XML Document

This document creates a log attribute parallel to the performance attribute created and refreshed with the documents described above.

Figure 9:
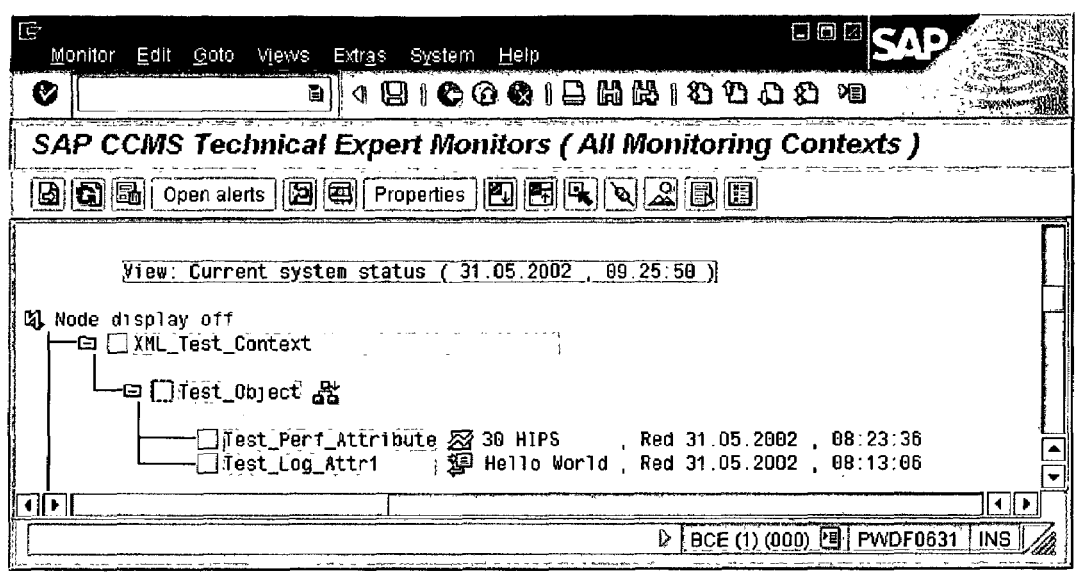
FIG. 9 is a screen shot showing an example of a log attribute added by means of a long-form XML document to the tree of FIG. 8.

The result is shown in FIG. 9.

Here is the XML document:

```
<SAP_CCMS:DataSupplierReport extcompany="Test" extproduct="New">
  <MTE:Instance type="CONTEXT" class="XML_TEST" owner="XML_TEST" numrange="AL_NR_AUTO" descmsgid="RT" descmsgno="112" co_method="CCMS_XML_FILE_POLL" an_method="cxml_an" au_method="cxml_au">
    <MTE:Name>XML_Test_Context</MTE:Name>
    <CNTXT:ContextParameters cntxt_clnt="000" cntxt_sysw="YES">
    </CNTXT:ContextParameters>
    <MTE:Instance type="OBJECT" class="XML_TEST_OBJECT" owner="XML_TEST" numrange="AL_NR_AUTO" descmsgid="RT" descmsgno="113" co_method="CCMS_XML_FILE_POLL" an_method="oxml_an" au_method="oxml_au">
      <MTE:Name>Test_Object</MTE:Name>
      <MTE:Instance type="LOG_ATTRIBUTE" class="XML_TEST_LAttrib" numrange="AL_NR_AUTO" owner="XML_TEST" descmsgid="RT" descmsgno="204" co_method="CCMS_XML_FILE_POLL" an_method="lxml_an" au_method="lxml_au">
        <MTE:Name>Test_Log_Attr1</MTE:Name>
        <LOG:LogParameters agroup="Test_LAttrGrp1" subtype="AL_STD_MSC_CACHE" severity="75" alkptype="AL_KEEP_OLDEST" alkpmax="12" sec_repeat="240" sec_inact="600" sec_warmup="10" m_maxalmid="22" m_kplinetp="AL_TD_KL_OLDEST" m_kplinemx="212" m_amsgmode="AL_TD_MSC_VAL_MODE_WORST_SINCE" m_msgtimfr="302">
          <LOG:M_RaiseSev>89</LOG:M_RaiseSev>
          <LOG:M_RaiseVal>AL_VAL_YELLOW</LOG:M_RaiseVal>
          <LOG:AlMsgID>00</LOG:AlMsgID>
          <LOG:AlMsgNo>398</LOG:AlMsgNo>
          <LOG:AlMsgVal>AL_VAL_RED</LOG:AlMsgVal>
          <LOG:AlMsgSev>210</LOG:AlMsgSev>
          <LOG:M_Client>010</LOG:M_Client>
          <LOG:M_User>XML_TEST</LOG:M_User>
          <LOG:MsgArg1>Hello World.</LOG:MsgArg1>
          <LOG:DefaultMsg>Hello World!</LOG:DefaultMsg>
          <LOG:ReportedBy>XML_TEST</LOG:ReportedBy>
        </LOG:LogParameters>
      </MTE:Instance>
    </MTE:Instance>
  </MTE:Instance>
</SAP_CCMS:DataSupplierReport>
```

Creating a Status Message Attribute—Long-Form XML Document

This document creates the monitoring tree leading to a status message attribute, an MTE that captures discrete messages from a reporting component.

Figure 10:
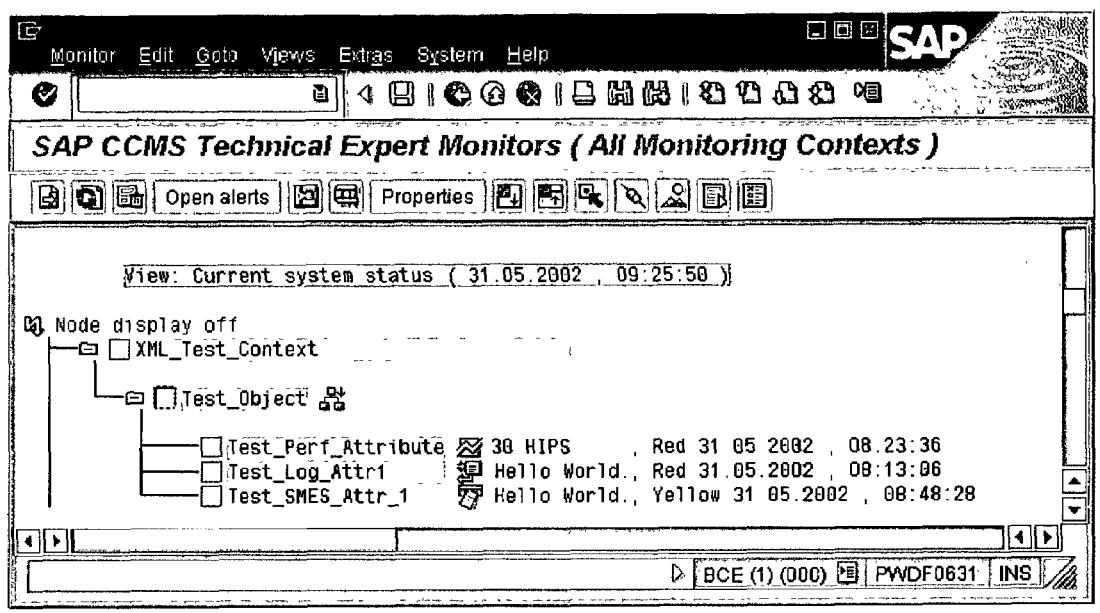
FIG. 10 is a screen shot showing an example of a status message attribute added by means of a long-form XML document to the tree of FIG. 9.

The result is shown in FIG. 10. The XML document is as follows:

```
<SAP_CCMS:DataSupplierReport extcompany="Test" extproduct="New">
<MTE:Instance type="CONTEXT" class="XML_TEST" owner="XML_TEST"
numrange="AL_NR_AUTO" descmsgid="RT" descmsgno="112" co_method="CCMS_XML_FILE_POLL"
an_method="cxml_an" au_method="cxml_au">
    <MTE:Name>XML_Test_Context</MTE:Name>
    <CNTXT:ContextParameters cntxt_clnt="000" cntxt_sysw="YES">
</CNTXT:ContextParameters>
    <MTE:Instance type="OBJECT" class="XML_TEST_OBJECT" owner="XML_TEST"
numrange="AL_NR_AUTO" descmsgid="RT" descmsgno="113" co_method="CCMS_XML_FILE_POLL"
an_method="oxml_an" au_method="oxml_au">
    <MTE:Name>Test_Object</MTE:Name>
    <MTE:Instance type="STATUS_ATTRIBUTE" class="XML_TEST_SAttrib"
numrange="AL_NR_AUTO" owner="STEPH" descmsgid="RT" descmsgno="204"
co_method="CCMS_XML_FILE_POLL" an_method="sxml_an" au_method="sxml_au">
    <MTE:Name>Test_SMES_Attr_1</MTE:Name>
    <SMES:StatusParameters agroup="Test_SAttrGrp1"
subtype="AL_STD_SMES_GREEN_ONLY_EXPLIC" severity="75"
s_almode="AL_SMSG_ALMODE_VALUE_CHG" s_alshift="AL_SMSG_ALSHIFT_RAY_YAG"
alkptype="AL_KEEP_NEWEST" alkpmax="12" sec_repeat="240" sec_inact="600"
sec_warmup="10">
    <SMES:AlMsgID>00</SMES:AlMsgID>
    <SMES:AlMsgNo>398</SMES:AlMsgNo>
    <SMES:MsgArg1>Hello World.</SMES:MsgArg1>
    <SMES:AlMsgVal>AL_VAL_RED</SMES:AlMsgVal>
    <SMES:DefaultMsg>Hello World!</SMES:DefaultMsg>
    <SMES:ReportedBy>XML_TEST</SMES:ReportedBy>
    </SMES:StatusParameters>
    </MTE:Instance>
    </MTE:Instance>
    </MTE:Instance>
    </SAP_CCMS:DataSupplierReport>
```

A Java HTTP Client for Testing

Here is a sample class for testing the transmission of a XML document to the CCMS by means of an HTTP POST request. You must customize the instantiation of the socket class to use the name and HTTP port (set in the instance profile) of your SAP application server. You also need to insert your own XML document in the output string of the POST request. Don't forget to observe the required Java conventions for escaping special characters. Be sure to set the content-length header correctly. A content-length that is longer than the number of characters in the XML DataSupplierReport will, for example, cause the client to hang until the connection times out, since this primitive client does not respond to the SAP request for the remaining data to fulfill the content-length specification.

```
/*
 * xml_test_client.java
 *
 * Created on 6. Mai 2002, 10:58
 */
/**
 *
 * @author SAP
 * @version
 */
import java.io.*;
import java.net.*;
public class xml_test_client {
    public static void main(String args[ ])
    {
        try       {
                Socket clientsocket = new Socket("fully-qualified host name of SAP App
                    Server", <SAP HTTP Port number>);
                System.out.println("Client: " + clientsocket);
/* Send an XML document to the CCMS */
                sendpost (clientsocket);
```

-continued

```
/* Request the SAP CCMS DTD for the monitoring architecture */
            getpage(clientsocket);
        }
    catch (UnknownHostException uhe) {
       System.out.println("UnknownHostException: " + uhe);
    }
    catch (IOException ioe) {
       System.out.println("IOException: " + ioe);
    }
}
public static void sendpost (Socket clientsocket)
{
   try {
      DataOutputStream outbound = new DataOutputStream(
         clientsocket.getOutputStream( ) ) ;
      BufferedReader inbound = new BufferedReader(
         new InputStreamReader(clientsocket.getInputStream( )) );
      outbound.writeBytes("POST /sap/bc/ccms/monitoring/CCMS_XML HTTP/1.0\r\nHost:
fully-qualified host name of SAP App Server\r\nContent-Type: text/xml\r\nContent-
Length: <nnnn>\r\n\r\n<SAP_CCMS:DataSupplierReport extcompany=\"SAP_CCMS\"
extproduct=\"XML_Interface\" interface=\"XAL\" version=\"1.0\"><MTE:Instance
type=\"CONTEXT\" class=\"XML_TEST\" owner=\"XML_TEST\" numrange=\"AL_NR_AUTO\"
descmsgid=\"RT\" descmsgno=\"112\" co_method=\"cxml_co\" an_method=\"cxml_an\"
au_method=\"cxml_au\"><MTE:Name>XML_Test_Context</MTE:Name><CNTXT:ContextParameters
cntxt_clnt=\"000\" cntxt_sysw=\"YES\"></CNTXT:ContextParameters><MTE:Instance
type=\"OBJECT\" class=\"XML_TEST_OBJECT\" owner=\"XML_TEST\" numrange=\"AL_NR_AUTO\"
descmsgid=\"RT\" descmsgno=\"113\" co_method=\"oxml_co\" an_method=\"oxml_an\"
au_method=\"oxml_au\"><MTE:Name>Test_Object</MTE:Name><MTE:Instance
type=\"PERFORMANCE_ATTRIBUTE\" class=\"XML_TEST_PAttrib\" numrange=\"AL_NR_AUTO\"
owner=\"XML_TEST\" descmsgid=\"RT\" descmsgno=\"114\" co_method=\"CCMS_XML_FILE_POLL\"
an_method=\"pxml_an\"
au_method=\"pxml_au\"><MTE:Name>Test_Perf_Attribute</MTE:Name><PRF:PerformanceParameters
agroup=\"test_xml\" subtype=\"AL_STD_NO_SUBCLASS\" severity=\"248\"
alkptype=\"AL_KEEP_OLDEST\" alkpmax=\"12\" g2y=\"5\" y2r=\"10\" r2y=\"8\" y2g=\"4\"
p_unit=\"HIPS\" p_decimals=\"1\" p_relval=\"AL_PERF_RV_SMOOTH_05\"
p_thrshdir=\"ABOVE\" almsgid=\"RT\" almsgno=\"001\" sec_repeat=\"240\"
sec_inact=\"600\"
sec_warmup=\"10\""><PRF:TotalVal>300</PRF:TotalVal><PRF:NumberVal>1</PRF:NumberVal><PRF:
ReportedBy>XML_TEST</PRF:ReportedBy></PRF:PerformanceParameters></MTE:Instance>
</MTE:Instance></MTE:Instance></SAP_CCMS:DataSupplierReport>");
         String responseLine;
         while ((responseLine = inbound.readLine( )) != null)
         {
            System.out.println(responseLine);
         }
         outbound.close( );
         inbound.close( );
         clientsocket.close( );
      }
   catch (IOException ioe)   {
      System.out.println("IOException: " + ioe);
    }
}
public static void getpage (Socket clientsocket)
{
try
{
   DataOutputStream outbound = new DataOutputStream(
      clientsocket.getOutputStream( ) ) ;
   BufferedReader inbound = new BufferedReader(
      new InputStreamReader(clientsocket.getInputStream( )) );
   outbound.writeBytes("GET
/sap/bc/ccms/monitoring/CCMS_XML?Name=\"CCMS_INSTRUMENTATION_DTD\"
      HTTP/1.0\r\n\r\n");
         String responseLine;
         while ((responseLine = inbound.readLine( )) != null) {
            System.out.println(responseLine);
         }
         outbound.close( );
         inbound.close( );
         clientsocket.close( );
      }
    catch (IOException ioe)   {
      System.out.println("IOException: " + ioe);
    }
  }
}
```

The CCMS XML DTD

```
<?xml version="1.0" encoding="UTF-8"?>
<!-- -->
<!-- This DTD defines a document for reporting data into the SAP CCMS      -->
<!-- Monitoring Architecture. It encapsulates the interface defined in     -->
<!-- the ABAP SALI function group in the SAP System. This DTD is automatically -->
<!-- added to an XML document sent to the Monitoring Architecture.         -->
<!DOCTYPE SAP_CCMS:DataSupplierReport
   <!ELEMENT SAP_CCMS:DataSupplierReport (MTE:Instance+, CMS_METHOD:MethodDefinition* )
   <!ATTLIST SAP_CCMS:DataSupplierReport
     xmlns:SAP_CCMS="http://www.sap.com/namespace/CCMS/Monitoring"
     xmlns:MTE="http://www.sap.com/namespace/CCMS/Monitoring/MTE"
     xmlns:CNTXT="http://www.sap.com/namespace/CCMS/Monitoring/MTE/CNTXT"
     xmlns:PRF="http://www.sap.com/namespace/CCMS/Monitoring/MTE/PRF"
     xmlns:SMES="http://www.sap.com/namespace/CCMS/Monitoring/MTE/SMES"
     xmlns:LOG="http://www.sap.com/namespace/CCMS/Monitoring/MTE/LOG"
     xmlns:REF="http://www.sap.com/namespace/CCMS/Monitoring/MTE/REF"
     xmlns:TXT="http://www.sap.com/namespace/CCMS/Monitoring/MTE/TXT"
     xmlns:CCMS_METHOD="http://www.sap.com/namespace/CCMS/Monitoring/CCMS_METHOD">
     extcompany    CDATA #REQUIRED
     extproduct    CDATA #REQUIRED
     interface     CDATA #IMPLIED
     version       CDATA #IMPLIED
     auditlevel    CDATA #IMPLIED>
        <!-- Instance is an MTE in a monitoring tree. The first Instance must always -->
<!-- be of type context. The monitoring tree must be completely instantiated -->
<!-- from the context downwards. Exception: You can directly address a single -->
<!-- MTE that already exists by using the FullName element. In this case,-->
<!-- the XML document handler uses the unique complete name of the MTE to -->
<!-- obtain its handle and then reports the data into the MTE. Typically, -->
<!-- you will first instantiate a monitoring tree once and then use the -->
<!-- fullname for more compact reporting to the monitoring attributes at-->
<!-- the leaf-level in the tree.                                         -->
   <!ELEMENT MTE:Instance ((MTE:Name | MTE:FullName), (CNTXT:ContextParameters? |
      PRF:PerformanceParameters | SMES:StatusParameters |
      LOG:LogParameters | REF:RefParameters | TXT:TextParameters),
      MTE:Instance*)>
<!-- Instance specifies attributes that are common to all MTEs -->
   <!ATTLIST MTE: Instance
<!-- Type of MTE -->
     type (CONTEXT | SUMMARY | OBJECT | PERFORMANCE_ATTRIBUTE | STATUS_ATTRIBUTE |
          LOG_ATTRIBUTE | REFERENCE_ATTRIBUTE | TEXT_ATTRIBUTE) #REQUIRED
<!-- MTE class: parameter MT_CLASS or MTE_CLASS in SALI -->
     class CDATA #IMPLIED
<!-- Number range of MTE: AL_NR_AUTO for MTEs that are deleted at system -->
<!-- restart, AL_NR_AUTO for MTEs that persist across system starts -->
     numrange (AL_NR_AUTO | AL_NR_AUTO) #IMPLIED
<!-- Owner of a context MTE: owner of a monitoring tree -->
     owner CDATA #REQUIRED
<!-- ID of an SAP T100 message that provides F1 help for an MTE -->
     descmsgid CDATA #IMPLIED
<!-- Number of an SAP T100 message that provides F1 help for an MTE -->
     descmsgno CDATA #IMPLIED
<!-- Name of the data collection method for an MTE, if any -->
     co_method CDATA #IMPLIED
<!-- Name of the analysis method for an MTE, if any -->
     an_method CDATA #IMPLIED
<!-- Name of the autoreaction method for an MTE, if any -->
     au_method CDATA #IMPLIED>
<!-- Name of an MTE: may be up to 40 characters long, not translatable -->
   <!ELEMENT MTE:Name (#PCDATA)>
<!-- Fully specified name of an MTE. Used for short-form XML message -->
<!-- to update an existing MTE -->
   <!ELEMENT MTE:FullName (#PCDATA)>
<!-- Context attributes: cntxt_clnt - specific client to which context  -->
<!-- refers and which can be used in monitor definitions (views)        -->
<!-- cntxt_sysw - whether a context exists once in a system or once in  -->
<!-- each monitoring segment                                            -->
<!-- cntxt_segm - Monitoring segment in which a context is to be created -->
<!--                 May not be used with the file method.              -->
   <!ELEMENT CNTXT:ContextParameters (#PCDATA)>
   <!ATTLIST CNTXT:ContextParameters
     cntxt_clnt CDATA #IMPLIED
     cntxt_sysw (YES | NO) #IMPLIED
     cntxt_segm #IMPLIED>
<!-- Elements and attributes for performance attribute MTEs        -->
<!-- Element TotalVal - sum of performance values to be reported   -->
<!-- Element NumberVal - number of values in the TotalVal sum      -->
```

```
    <!ELEMENT PRF:PerformanceParameters (PRF:TotalVal, PRF:NumberVal, PRF:ReportedBy)>
    <!ATTLIST PRF:PerformanceParameters
<!-- agroup: attribute group to which MTE belongs, for customizing (40 char) -->
    agroup CDATA #IMPLIED
<!-- subtype: operative subtype of MTE (behavior of performance MTE) -->
    subtype (AL_STD_NO_SUBCLASS |
            AL_STD_PERF_FREQ_1_MINUTE |
            AL_STD_PERF_COUNTER |
            AL_STD_PERF_QUALITY_COUNTER |
            AL_STD_PERF_AVAILABILITY |
            AL_STD_PERF_OCCUPANCY |
            AL_STD_PERF_OCCUPANCY_DIFF |
            AL_STD_PERF_HEARTBEAT |
            AL_STD_PERF_HEARTBEAT_AVAIL |
            AL_STD_PERF_COUNTER_PER_SEC) #IMPLIED
<!-- severity: weighting of alert within value (green, yellow, red) -->
    severity CDATA #IMPLIED
<!-- alkptype: Alerts to keep should alerts need to be discarded -->
    alkptype (AL_KEEP_NEWEST | AL_KEEP_OLDEST) #IMPLIED
<!-- alkpmax: Number of alerts to hold for an MTE of this class -->
    alkpmax CDATA #IMPLIED
<!-- Thresholds for green to yellow and to red and back down        -->
<!-- Alerts are triggered at yellow and red thresholds              -->
    g2y CDATA #REQUIRED
    y2r CDATA #REQUIRED
    r2y CDATA #IMPLIED
    y2g CDATA #IMPLIED
<!-- p_unit: Unit to display for performance MTE (up to four characters) -->
    p_unit CDATA #IMPLIED
<!-- p_decimals: Number of decimal places to insert in reported value -->
    p_decimals CDATA #IMPLIED
<!-- p_relval: Value to compare to thresholds for generating alerts -->
    p_relval (AL_PERF_RV_LAST |
            AL_PERF_RV_QUARTER |
            AL_PERF_RV_HOUR |
            AL_PERF_RV_SMOOTH_01 |
            AL_PERF_RV_SMOOTH_5 |
            AL_PERF_RV_SMOOTH_15) #IMPLIED
<!-- p_thrshdir: relevant direction for violations - above or below threshold -->
    p_thrshdir (ABOVE | BELOW) #IMPLIED
<!-- almsgid and almsgno - T100 message identification for alert messages -->
<!-- Defaults to a standard threshold violation message -->
    almsgid CDATA #IMPLIED
    almsgno CDATA #IMPLIED
<!-- sec_repeat: Interval at which to repeat data collection method - default 0, no repetition -->
    sec_repeat #IMPLIED
<!-- sec_inact: Interval after which MTE is set to inactive if no data comes - default 0 -->
    sec_inact #IMPLIED
<!-- sec_warmup: Interval after system start during which alerts should be suppressed -->
    sec warmup #IMPLIED>
<!-- Element TotalVal - sum of performance values to be reported        -->
    <!ELEMENT PRF:TotalVal (#PCDATA)>
<!-- Element NumberVal - number of values in the TotalVal sum          -->
    <!ELEMENT PRF:NumberVal (#PCDATA)>
<!-- Reporter of data - should be the external component responsible for data -->
    <!ELEMENT PRF:ReportedBy (#PCDATA)>
<!-- Elements and attributes for status message attribute MTEs        -->
    <!ELEMENT SMES:StatusParameters (SMES:AlMsgID, SMES:AlMsgNo, (SMES:MsgArg1,
        (SMES:MsgArg2, (SMES:MsgArg3, (SMES:MsgArg4?)?)?)?),
        SMES:AlMsgVal, SMES:DefaultMsg, SMES:ReportedBy)>
    <!ATTLIST SMES:StatusParameters
<!-- agroup: attribute group to which MTE belongs, for customizing (40 char) -->
    agroup CDATA #IMPLIED
<!-- subtype: operative subtype of MTE (behavior of performance MTE) -->
    subtype (AL_STD_SMES_GREEN_ONLY_EXPLIC |
            AL_STD_SMES_TRIGGER_STARTUP_TL |
            AL_STD_SMES_HEARTBEAT) #IMPLIED
<!-- severity: weighting of alert within value (green, yellow, red) -->
    severity CDATA #IMPLIED
<!-- s_almode: grade of alert suppression - none to complete suppression -->
    s_almode (AL_SMSG_ALMODE_ALWAYS |
            AL_SMSG_ALMODE_VALUE_CHG |
            AL_SMSG_ALMODE_MSG_CHG |
            AL_SMSG_ALMODE_NEVER) #IMPLIED
<!-- s_alshift: optionally shift reported alert values up or down -->
    s_alshift (AL_SMSG_ALSHIFT_UNCHG |
            AL_SMSG_ALSHIFT_R_AS_Y |
            AL_SMSG_ALSHIFT_Y_AS_R |
            AL_SMSG_ALSHIFT_RAY_YAG) #IMPLIED
```

-continued

```
<!-- alkptype: Alerts to keep should alerts need to be discarded -->
    alkptype (AL_KEEP_NEWEST | AL_KEEP_OLDEST) #IMPLIED
<!-- alkpmax: Number of alerts to hold for an MTE of this class -->
    alkpmax CDATA #IMPLIED
<!-- sec_repeat: Interval at which to repeat data collection method - default 0, no repetition -->
    sec_repeat CDATA #IMPLIED
<!-- sec_inact: Interval after which MTE is set to inactive if no data comes - default 0 -->
    sec_inact CDATA #IMPLIED
<!-- sec_warmup: Interval after system start during which alerts should be suppressed -->
    sec_warmup CDATA #IMPLIED
<!-- almsgid and almsgno - T100 message that is to be reported at this time -->
<!-- 00 398 can be used to construct a message out of four variables -->
    <!ELEMENT SMES:AlMsgID (#PCDATA)>
    <!ELEMENT SMES:AlMsgNo (#PCDATA)>
<!-- Values for variables in messages -->
    <!ELEMENT SMES:MsgArg1 (#PCDATA)>
    <!ELEMENT SMES:MsgArg2 (#PCDATA)>
    <!ELEMENT SMES:MsgArg3 (#PCDATA)>
    <!ELEMENT SMES:MsgArg4 (#PCDATA)>
<!-- AlMsgVal: Alert value of this message - AL_VAL_GREEN, AL_VAL_YELLOW or AL_VAL_RED -->
    <!ELEMENT SMES:AlMsgVal (#PCDATA)>
<!-- DefaultMsg: Message text with fully resolved variables to display should no T100 message be found -->
    <!ELEMENT SMES: DefaultMsg (#PCDATA)>
<!-- Reporter of data - should be the external component responsible for data -->
    <!ELEMENT SMES:ReportedBy (#PCDATA)>
<!-- Elements and attributes for message log attribute MTEs -->
    <!ELEMENT LOG:LogParameters (LOG:M_RaiseSev?, LOG:M_RaiseVal?, LOG:AlMsgID,
                          LOG:AlMsgNo, LOG:AlMsgVal?, LOG:AlMsgSev?,
                          LOG:M_Client?, LOG:M_User?, (LOG:MsgArg1, (LOG:MsgArg2,
                          (LOG:MsgArg3, (LOG:MsgArg4?)?)?)?),
                          LOG:DefaultMsg, LOG:ReportedBy)>
    <!ATTLIST LOG:LogParameters
<!-- agroup: attribute group to which MTE belongs, for customizing (40 char) -->
    agroup CDATA #IMPLIED
<!-- subtype: operative subtype of MTE (type of log MTE, default CACHE - MTE itself stores messages)  -->
    subtype (AL_STD_MSC_CACHE |
             AL_STD_MSC_SYSLOG |
             AL_STD_MSC_EXTERNAL |
             AL_STD_MSC_LOGFILE |
             AL_STD_MSC_SECAUDIT) #IMPLIED
<!-- severity: weighting of alert within value (green, yellow, red)   -->
    severity CDATA #IMPLIED
<!-- alkptype: Alerts to keep should alerts need to be discarded -->
    alkptype (AL_KEEP_NEWEST | AL_KEEP_OLDEST) #IMPLIED
<!-- alkpmax: Number of alerts to hold for an MTE of this class -->
    alkpmax CDATA #IMPLIED
<!-- sec_repeat: Interval at which to repeat data collection method - default 0, no repetition -->
    sec_repeat CDATA #IMPLIED
<!-- sec_inact: Interval after which MTE is set to inactive if no data comes - default 0 -->
    sec_inact CDATA #IMPLIED
<!-- sec_warmup: Interval after system start during which alerts should be suppressed -->
    sec_warmup CDATA #IMPLIED
<!-- m_maxalmid: Maximum number of alerts to keep for each message ID represented in message log -->
    m_maxalmid CDATA #IMPLIED
<!-- m_kplinetp: Message lines to keep should messages be displaced from the log (type CACHE) -->
    m_kplinetp (AL_TD_KL_ALL |
                AL_TD_KL_NEWEST |
                AL_TD_KL_OLDEST) #IMPLIED
<!-- m_kplinemx: Maximum number of message lines to keep in the log (type CACHE) -->
    m_kplinemx CDATA #IMPLIED
<!-- m_amsgmode: Message to present for display - most recent, worst since, most severe -->
    m_amsgmode (AL_TD_MSC_VAL_MODE_LAST |
                AL_TD_MSC_VAL_MODE_HIGHALRT |
                AL_TD_MSC_VAL_MODE_WORST_SINCE |
                AL_MSC_VAL_MODE_LAST) #IMPLIED
<!-- m_msgtimfr: Time frame within which to evaluate messages (mode WORST_SINCE) -->
    m_msgtimfr #IMPLIED>
<!-- M_RaiseSev and M_RaiseVal: Weighting (0–255) within an alert value -->
<!--       and alert value (yellow, red) above which an alert should be triggered -->
    <!ELEMENT LOG:M_RaiseSev (#PCDATA)>
<!-- M_RaiseSev: Weighting (0–255) of log alerts within alert level (yellow, red) -->
    <!ELEMENT LOG:M_RaiseVal (#PCDATA)>
<!-- almsgid and almsgno - T100 message identification of message to report -->
    <!ELEMENT LOG:AlMsgID (#PCDATA)>
    <!ELEMENT LOG:AlMsgNo (#PCDATA)>
<!-- AlMsgVal: Alert value of message being reported (green, yellow, red) -->
    <!ELEMENT LOG:AlMsgVal (#PCDATA)>
    <!ELEMENT LOG:AlMsgSev (#PCDATA)>
```

```
-continued

<!-- M_Client, M_User: Client and user associated with message -->
  <!ELEMENT LOG:M_Client (#PCDATA)>
  <!ELEMENT LOG:M_User (#PCDATA)>
<!-- Values for variables in messages -->
  <!ELEMENT LOG:MsgArg1 (#PCDATA)>
  <!ELEMENT LOG:MsgArg2 (#PCDATA)>
  <!ELEMENT LOG:MsgArg3 (#PCDATA)>
  <!ELEMENT LOG:MsgArg4 (#PCDATA)>
<!-- DefaultMsg: Message text with fully resolved variables to display should no T100 message be found -->
  <!ELEMENT LOG:DefaultMsg (#PCDATA)>
<!-- Reporter of data - should be the external component responsible for data -->
  <!ELEMENT LOG:ReportedBy (#PCDATA)>
<!-- Elements and attributes for reference attribute MTEs          -->
  <!ELEMENT REF:RefParameters (REF:RefText, (REF:ReferenceTID | REF:RefFname)>
<!-- RefText: Text to display with reference MTE -->
  <!ELEMENT REF:RefText (#PCDATA)>
<!-- TID of MTE to which reference MTE refers (alternative to MTE full name) -->
  <!ELEMENT REF:ReferenceTID (MTE:MTSYSID, MTE:MTMCNAME, MTE:MTNUMRANGE,
                              MTE:MTUID, MTE:MTCLASS, MTE:MTINDEX, MTE: EXTINDEX)>
  <!ELEMENT MTE:MTSYSID (#PCDATA)>
  <!ELEMENT MTE:MTMCNAME (#PCDATA)>
  <!ELEMENT MTE:MTNUMRANGE (#PCDATA)>
  <!ELEMENT MTE:MTUID (#PCDATA)>
  <!ELEMENT MTE:MTCLASS (#PCDATA)>
  <!ELEMENT MTE:MTINDEX (#PCDATA)>
  <!ELEMENT MTE:EXTINDEX (#PCDATA)>
<!-- RefFname: Fullname of MTE to which reference MTE refers (alternative to TID) -->
  <!ELEMENT REF:RefFname (#PCDATA)>
<!-- Elements and attributes for reference attribute MTEs          -->
  <!ELEMENT TXT:TextParameters (TXT:AttrText)
  <!ATTLIST TXT:Text Parameters
<!-- sec_repeat: Interval at which to repeat data collection method - default 0, no repetition -->
    sec_repeat CDATA #IMPLIED
<!-- sec_inact: Interval after which MTE is set to inactive if no data comes - default 0 -->
    sec_inact CDATA #IMPLIED>
<!-- AttrText: Text to display for text attribute (value) -->
  <!ELEMENT TXT:AttrText (#PCDATA)>
<!-- Method definition for XML MTEs - not yet supported in SAP_BASIS Release 6.30 -->
<!CCMS_METHOD:MethodDefinition (CCMS_METHOD:Name, CCMS_METHOD:ExecName,
                                CCMS_METHOD:Desc, ((CCMS_METHOD:Parm1,
                                CCMS_METHOD:Value1), ((CCMS_METHOD:Parm2,
                                CCMS_METHOD:Value2), ((CCMS_METHOD:Parm3,
                                CCMS_METHOD:Value3), ((CCMS_METHOD:Parm4,
                                CCMS_METHOD:Value4), ((CCMS_METHOD:Parm5,
                                CCMS_METHOD:Value5), ((CCMS_METHOD:Parm6,
                                CCMS_METHOD:Value6), ((CCMS_METHOD:Parm7,
                                CCMS_METHOD:Value7), ((CCMS_METHOD:Parm8,
                                CCMS_METHOD:Value8), ((CCMS_METHOD:Parm9,
                                CCMS_METHOD:Value9), ((CCMS_METHOD:Parm10,
                                CCMS_METHOD:Value1O)?)?)?)?)?)?)?)?)?)?)>
  <!ATTLIST CCMS_METHOD:MethodDefinition
    exectype (REPORT | FUNCTIONMODULE | TRANSACTION | URL) #REQUIRED
    dispatcher (MANUAL | DIALOG | BATCH | AGENT) #REQUIRED
    runonstart (YES | NO) #REQUIRED
    startsrv (CENTRAL | ALL) #REQUIRED
    multi_mte (SINGLEMTE | TABLEOFMTES) #REQUIRED
    methodtype (DATACOLLECTION | ANALYSIS | AUTOREACTION) #REQUIRED>
  <!ELEMENT CCMS_METHOD:Name (#PCDATA)>
  <!ELEMENT CCMS_METHOD:ExecName (#PCDATA)>
  <!ELEMENT CCMS_METHOD:Desc (#PCDATA)>
  <!ELEMENT CCMS_METHOD:Parm1 (#PCDATA)>
  <!ELEMENT CCMS_METHOD:Value1 (#PCDATA)>
  <!ELEMENT CCMS_METHOD:Parm2 (#PCDATA)>
  <!ELEMENT CCMS_METHOD:Value2 (#PCDATA)>
  <!ELEMENT CCMS_METHOD:Parm3 (#PCDATA)>
  <!ELEMENT CCMS_METHOD:Value3 (#PCDATA)>
  <!ELEMENT CCMS_METHOD:Parm4 (#PCDATA)>
  <!ELEMENT CCMS_METHOD:Value4 (#PCDATA)>
  <!ELEMENT CCMS_METHOD:Parm5 (#PCDATA)>
  <!ELEMENT CCMS_METHOD:Value5 (#PCDATA)>
  <!ELEMENT CCMS_METHOD:Parm6 (#PCDATA)>
  <!ELEMENT CCMS_METHOD:Value6 (#PCDATA)>
  <!ELEMENT CCMS_METHOD:Parm7 (#PCDATA)>
  <!ELEMENT CCMS_METHOD:Value7 (#PCDATA)>
  <!ELEMENT CCMS_METHOD:Parm8 (#PCDATA)>
  <!ELEMENT CCMS_METHOD:Value8 (#PCDATA)>
  <!ELEMENT CCMS_METHOD:Parm9 (#PCDATA)>
```

```
<!ELEMENT CCMS_METHOD:Value9 (#PCDATA)>
<!ELEMENT CCMS_METHOD:Parm1O (#PCDATA)>
<!ELEMENT CCMS_METHOD:Value1O (#PCDATA)>
}>
```

A number of embodiments of the invention have been described. Nevertheless, it will be understood that various modifications may be made without departing from the spirit and scope of the invention. For example, in lieu of http or file polling, FTP could be used to transfer an XML file. Accordingly, other embodiments are within the scope of the following claims.

What is claimed is:

1. A data collection interface method for supplying monitoring data from monitored components of a distributed computing system to a central monitoring system, comprising the steps of composing an XML compliant document at the monitored component containing monitored data derived from the monitored component, the XML document having a DTD associated with a tree-structured monitoring architecture, said DTD having two distinct formats, a long form for specifying the monitoring tree for the monitored component and a short form for providing current values of selected already established monitoring tree elements, making the contents of the document available electronically to a central monitoring system for using the monitored data to assess and report the condition of the monitored component.

2. The data collection method of claim 1 wherein said step of making the contents of the document available is carried out by the monitored component transmitting the document to the central monitoring system.

3. The data collection method of claim 2 wherein the step of transmitting the document is carried out by posting an HTTP message containing the document to said central monitoring system.

4. The data collection method of claim 1 wherein said step of making the contents of the document available is carried out by having the monitored component file the document in a directory, and update it from time to time, informing the monitoring system of the name and location of the file and exercising a polling capability in the monitoring system to periodically retrieve and read the contents of the document.

5. A method of sending monitoring messages from a monitored component to a central monitoring system, comprising the steps of composing an initial long-form XML document specifying a monitoring tree structure associated with the monitored component formatted according to a prescribed DTD;

making said long-form document available to the monitoring system;

subsequently composing from time to time short-form XML documents carrying current performance-related data derived from the monitored component associated with one or more of the specified monitoring tree elements formatted according to the prescribed DTD; and making each said short-form XML document, respectively, available to the monitoring system in order to enable the monitoring system to monitor the condition of said monitored component.

6. The method of claim 5 wherein said DTD is transmitted with both XML documents.

7. The method of claim 5, wherein said steps of making said XML documents available are carried out by posting an HTTP message containing the respective XML document to the monitoring system.

8. The method of claim 5, where said steps of making said XML documents available are carried out by filing a the respective XML document in a file location accessible to the monitoring system.

9. A monitoring system having a standard interface for receiving monitored data from monitored computing components compliant with a uniform interface, wherein the improvement comprises an XML processor for translating XML documents containing monitoring information from monitored noncompliant components not conversant with the uniform interface, the XML processor translating the contents of the XML documents into said uniform interface and applying them to the standard interface, wherein at least some of said XML documents have a DTD corresponding to a monitoring tree architecture associated with said central monitoring system, said DTD having two distinct formats, a long form for specifying the monitoring tree for the monitored component and a short form for providing current values of selected already established monitoring tree elements.

10. A monitoring system for gathering monitoring data from distributed computer components, comprising a central monitoring system, a standard interface to said central monitoring system for receiving monitoring data from computing components in a uniform format compliant with a standard instrumentation interface, and an XML processor/translator for receiving, parsing and translating XML documents containing monitoring information from monitored noncompliant components not conversant with the uniform interface, the XML processor/translator translating the contents of the XML documents into said uniform format and applying them to the standard interface, the standard interface receiving monitoring data directly from components that are compliant with the uniform interface and also indirectly from components that are not compliant with the uniform interface, and passing said monitoring data in either case to said central monitoring system, wherein at least some of said XML documents have a DTD corresponding to a monitoring tree architecture associated with said central monitoring system, said DTD) having two distinct formats, a long form for specifying the monitoring tree for the monitored component and a short form for providing current values of selected already established monitoring tree elements.

* * * * *